(12) United States Patent
Koorapaty et al.

(10) Patent No.: US 7,796,698 B2
(45) Date of Patent: Sep. 14, 2010

(54) INTERFERENCE SUPPRESSION IN A MULTICARRIER RECEIVER

(75) Inventors: Havish Koorapaty, Cary, NC (US);
Rajaram Ramesh, Raleigh, NC (US);
Kumar Balachandran, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 11/757,731

(22) Filed: Jun. 4, 2007

(65) Prior Publication Data
US 2008/0298524 A1 Dec. 4, 2008

(51) Int. Cl.
*H04K 1/10* (2006.01)
*H04Q 7/20* (2006.01)

(52) U.S. Cl. .................... 375/260; 455/443; 455/456.6

(58) Field of Classification Search ................. 375/144, 375/148, 260, 262, 265, 341, 346; 455/443, 455/450, 456.5, 456.6, 464
See application file for complete search history.

(56) References Cited

U.S. PATENT DOCUMENTS

2004/0131007 A1 7/2004 Smee et al.
2005/0152485 A1* 7/2005 Pukkila et al. ............. 375/348
2007/0025454 A1* 2/2007 Jones et al. ................ 375/260

FOREIGN PATENT DOCUMENTS

WO 2007/024934 A2 3/2007

OTHER PUBLICATIONS

Morelli, M. et al. "A Comparsion of Pilot-Aided Channel Estimation Methods for OFDM Systems." IEEE Transactions on Signal Processing, vol. 49, No. 12, Dec. 2001, pp. 3065-3073.
Panayirci, E. et al. "Maximum A Posteriori Multipath Fading Channel Estimation for OFDM Systems." European Transactions on Telecommunications, vol. 13, No. 5, Sep.-Oct. 2002, pp. 487-494.

* cited by examiner

*Primary Examiner*—Young T. Tse
(74) *Attorney, Agent, or Firm*—Coats & Bennett, P.L.L.C.

(57) ABSTRACT

A receiver uses knowledge of pilot symbols transmitted by a neighboring sector to reduce interference in a received data symbol. The received data symbol is transmitted on one or more data subcarriers in a first sector. Overlapping pilot symbols transmitted on overlapping pilot carriers in a second sector are determined and used to generate channel estimates for the overlapping pilot carriers. The overlapping pilot symbols and pilot channel estimates are then used to reduce interference in the received data symbol.

14 Claims, 5 Drawing Sheets

INTERFERENCE SUPPRESSION IN A MULTICARRIER RECEIVER

BACKGROUND

The present invention relates generally to methods and systems for suppressing interference in a mobile communication system and, more particularly, to methods and systems for suppressing intercell interference.

Orthogonal Frequency Division Multiplexing (OFDM) and Code Division Multiple Access (CDMA) systems are limited by interference. The interference may generally be categorized as intracell interference and intercell interference. Intracell interference is interference attributable to interfering sources (e.g., other users) in the same cell or sector and intercell interference is interference attributable to interfering sources in a neighboring cell or sector. Multi-user detection techniques have been developed to reduce or suppress intracell interference attributable to interfering sources in the same cell. In the case of intercell interference, suppression of the interference is more difficult because knowledge of the interfering signals is generally not available. Thus, the intercell interference is typically suppressed using statistical parameters related to the interference. These statistical parameters may be difficult to estimate over a short period of time. Further, interference suppression based on the use of statistical information is typically less effective than suppression of interference based on knowledge of the interfering signals. Therefore, there is an interest in developing methods and systems for reducing intercell interference beyond what is typically achieved using statistical parameters of the interference.

SUMMARY

The present invention relates to a multicarrier receiver that suppresses intercell interference based on knowledge of the signals transmitted in neighboring cells. In periods when the pilot subcarriers in neighboring cells overlap in time and frequency with data subcarriers for a subchannel of interest, the multicarrier receiver may use knowledge of the pilot symbols transmitted on the overlapping pilot subcarriers to suppress interference contributed by the interfering pilot symbols. The interfering pilot subcarriers may be identified by reading control information transmitted by a base station in the neighboring sector. The interfering pilot symbols may be determined from the sector ID of the neighboring sector. Once the interfering pilot symbols and pilot subcarriers are identified, the receiver may generate channel estimates for the overlapping pilot subcarriers. The known pilot symbols and channel estimates for the overlapping pilot subcarriers may be used to cancel interference from symbols of interest transmitted on a data subcarrier. Using knowledge of the pilot symbols transmitted in the neighboring sector provides better interference impression than using only statistical parameters of the interference.

DETAILED DESCRIPTION

Figure 1:
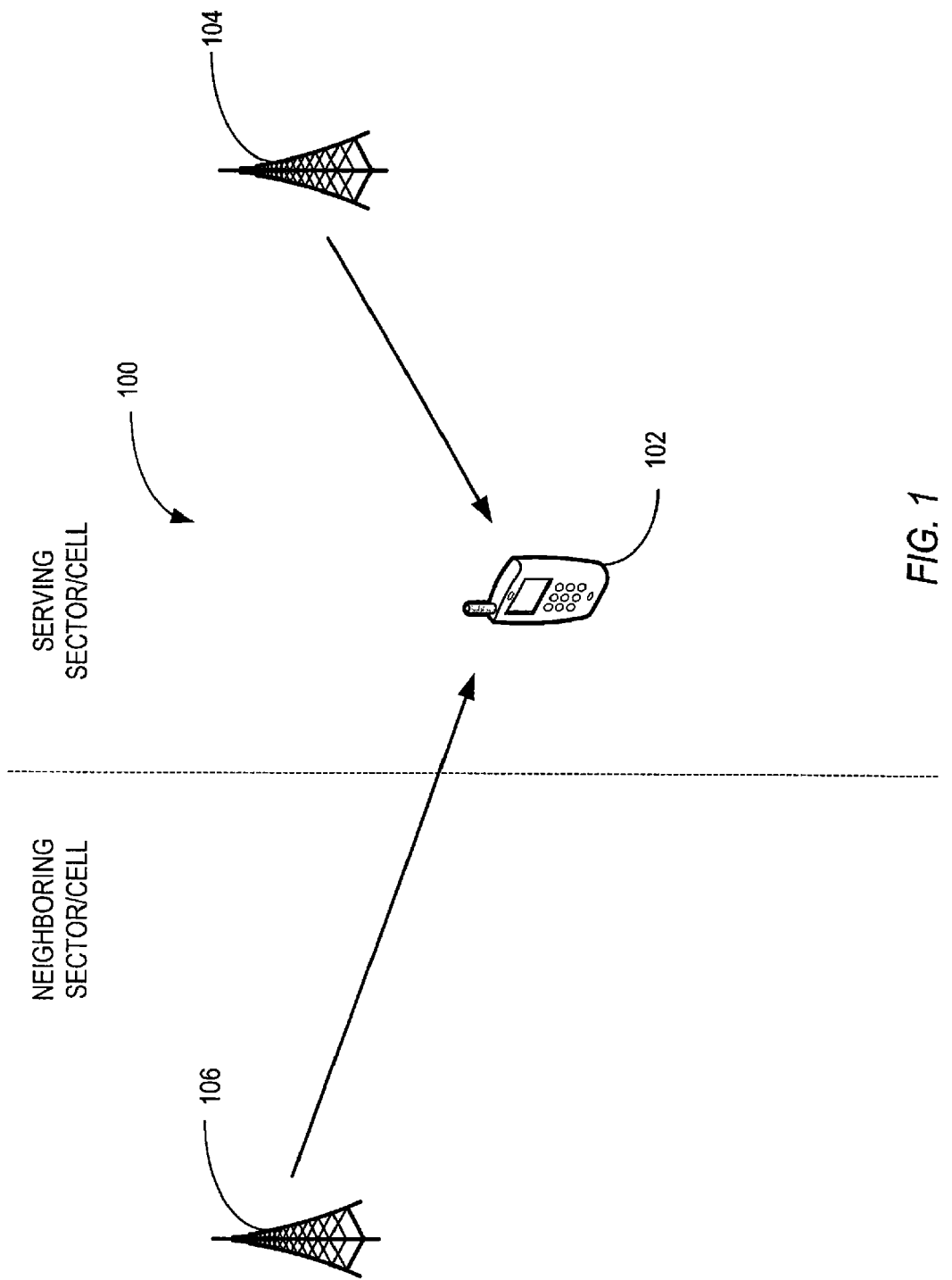
FIG. 1 illustrates a mobile communication system.

Referring now to the drawings, FIG. 1 illustrates a mobile station 102 in a mobile communication network 100. The mobile station 102 receives signals of interest from a base station 104 in a serving cell or sector. The mobile station 102 also receives interfering signals from a base station 106 in a neighboring cell or sector. The interfering signals may comprise data signals transmitted by base station 106 to other mobile stations in the neighboring sector, control signals transmitted by base station 106, or pilot signals transmitted by base station 106. Conventionally, the mobile station 102 estimates statistical parameters of the other cell interference and uses the statistical parameters to suppress the interference. According to the present invention, the mobile station 102 uses knowledge of pilot signals transmitted by the base station 106 in the neighboring cell or sector to reduce interference. Using knowledge of the transmitted pilot symbols provides better interference suppression than using only the statistical parameters of the interference.

As an example, one embodiment of the present invention will be described in the context of a WiMAX (IEEE 802.16) system. Those skilled in the art will appreciate, however, that the present invention is more generally applicable to other multicarrier communication systems, including other Orthogonal Frequency Division Multiplexing (OFDM) systems and Multicarrier Code Division Multiple Access (MC-CDMA) systems. In WiMAX systems, the available bandwidth is divided into a plurality of subcarriers. Some subcarriers are used to transmit data and are referred to herein as data subcarriers. Other subcarriers are used as a pilot for channel estimation and synchronization and are referred to herein as pilot subcarriers. There may also be null subcarriers to provide guard bands and DC carriers. In WiMAX systems, there may be circumstances when the pilot subcarriers in a neighboring cell or sector overlap with data subcarriers in a serving cell or sector. In this case, it is possible to determine the pilot symbols transmitted in the neighboring cell or sector and use this knowledge to cancel or suppress the interference attributable to the pilot transmission of a base station 106 in a neighboring cell or sector.

Figure 2:
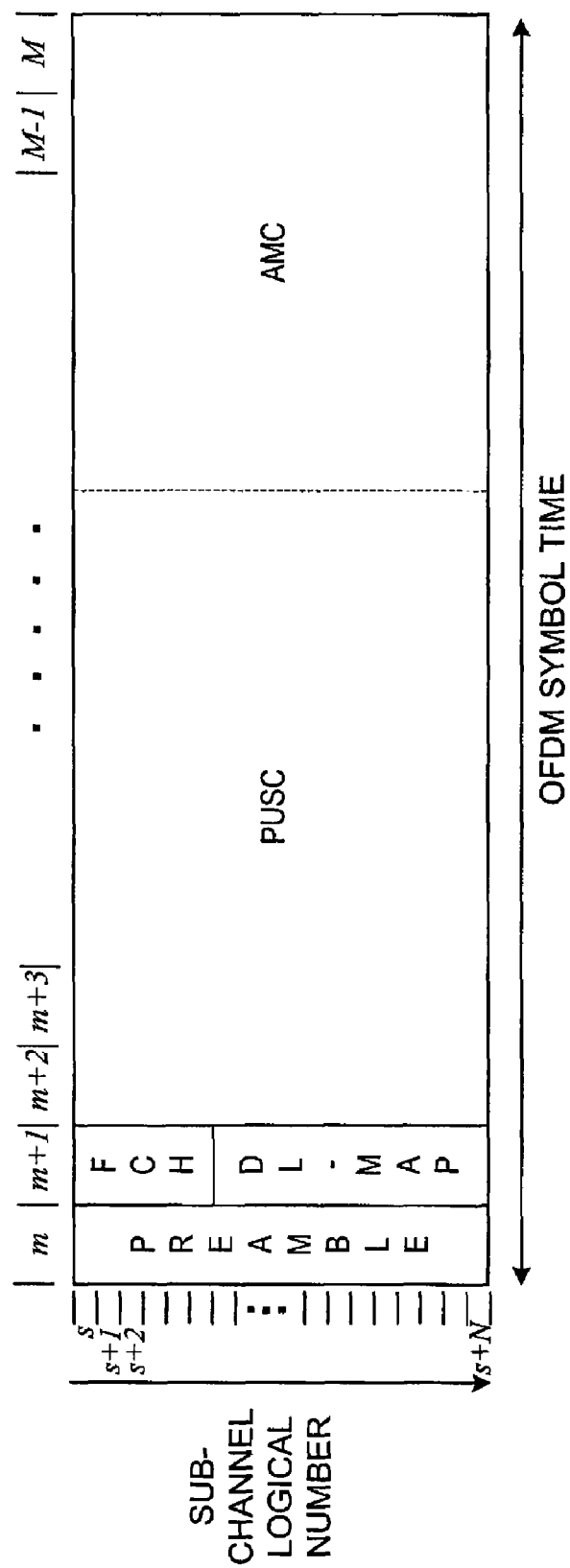
FIG. 2 illustrates an exemplary frame structure used in a WiMAX system.

In a WiMAX system, an OFDM frame comprises a downlink subframe and an uplink subframe. FIG. 2 illustrates the structure of a downlink subframe in a WiMAX system. The first symbol of the downlink subframe includes a preamble followed by one or more subcarrier allocation zones. The first symbol of the subcarrier allocation zone following the preamble is used to transmit essential control messages. This symbol contains the Frame Control Header (FCH) and resource allocation for the downlink and uplink known as the DL-MAP and UL-MAP respectively. The FCH contains preliminary control information such as the subchannel bitmap, coding information and details about the length of the DL-MAP. The subcarrier allocation zones may be broadly classified as distributed subcarrier allocation zones and neighboring subcarrier allocation zones. In distributed subcarrier allocation zones, subcarriers comprising a single subchannel are distributed across the available bandwidth to increase frequency diversity. Distributed subcarrier allocation modes are useful for high mobility users. In neighboring subcarrier allocation zones, subcarriers comprising a subchannel are grouped more closely together. Neighboring subcarrier allocation zones are useful for fixed or low mobility users.

FIG. 2 illustrates a downlink subframe having two subcarrier allocation zones, namely a partially-used subchannelization (PUSC) zone and an adaptive modulation and coding (AMC) zone. The PUSC zone is mandatory and always follows the preamble in the downlink. The PUSC zone uses a distributed subcarrier allocation mode so that the subcarriers corresponding to a subchannel are spread across the signal bandwidth, thus providing frequency diversity. In contrast, the AMC zone uses the neighboring subcarrier allocation mode so that the subcarriers allocated to a subchannel are grouped together. Those skilled in the art will appreciate that other subcarrier allocation zone types are defined in the WiMAX standard.

The entire downlink subframe (except for the preamble) may be occupied by one PUSC zone or, as shown in FIG. 2, may be subdivided into multiple zones. In each subcarrier allocation zone, a number of subcarriers are selected to serve as pilots. The distribution of pilot subcarriers is generally different for different subcarrier allocation zones. In a downlink frame, for example, the subcarrier indices for the pilot subcarriers in the PUSC zone is represented by the sequence [5, 9, 19, 24, 34, 39] in even symbol periods and by the sequence [1, 13, 15, 27, 29, 41, . . . ] in odd symbol periods. The pilot subcarrier indices for the AMC zone is represented by the sequence [5, 10, 15, 20, . . . ] for all symbol periods.

In WiMAX systems, the base stations are synchronized to the same frame and symbol timing. While frame and symbol timing is synchronized, the subcarrier allocation zones need not be synchronized. A neighboring sector may employ a different number and different types of subcarrier allocation zones than a serving sector. Thus, there may be periods when the pilot subcarriers used in a neighboring sector overlap with data subcarriers in a serving sector.

Figure 3:
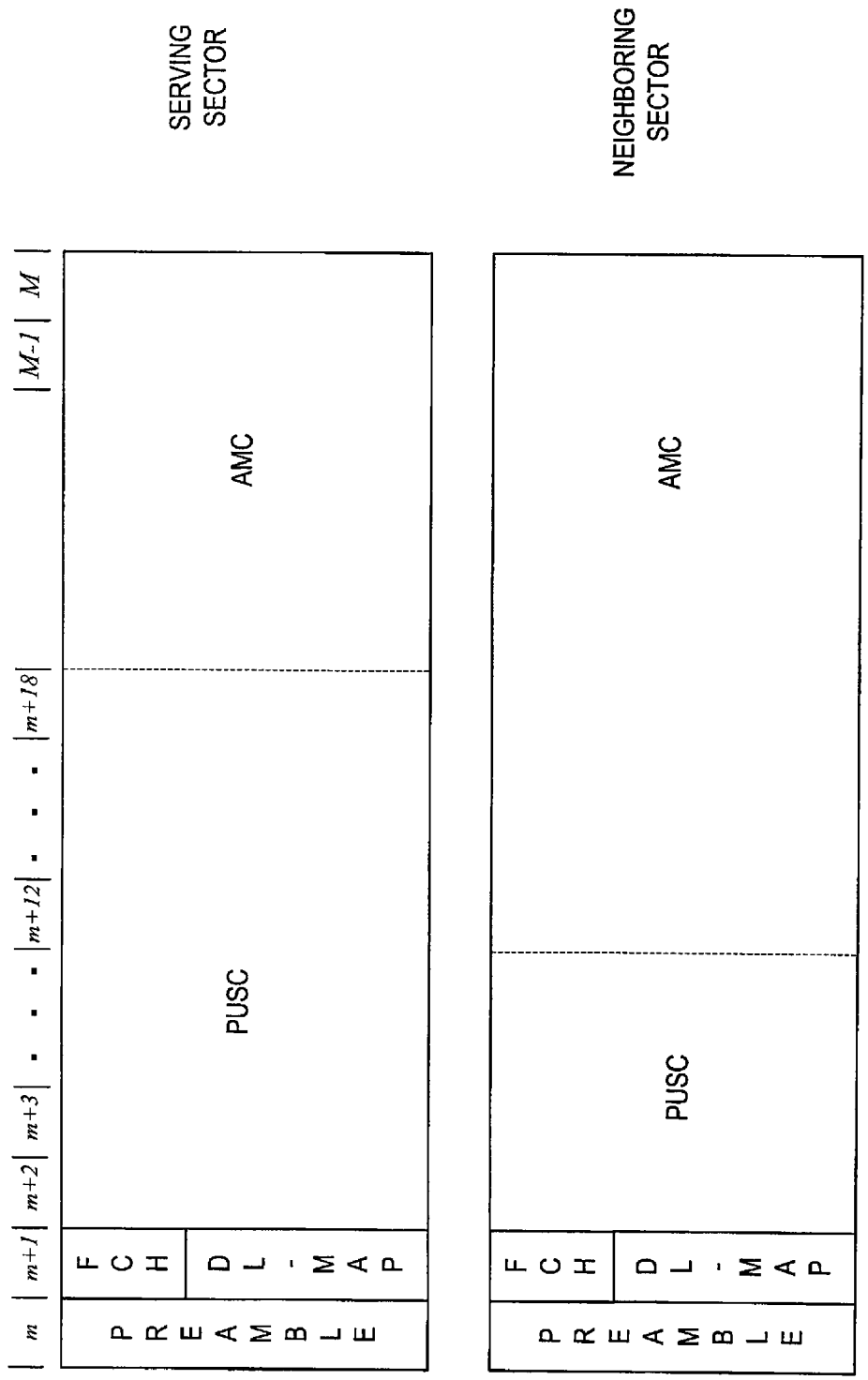
FIG. 3 illustrates subcarrier allocation zones in two neighboring sectors.

FIG. 3 illustrates one example where the pilot subcarriers in a neighboring sector overlap with data subcarriers in a serving sector. In this example, both the serving sector and the neighboring sector have divided the downlink subframe into a PUSC zone and an AMC zone. The PUSC zone in the serving sector is longer in duration (measured by symbol periods) than the PUSC zone in the neighboring sector. Consequently, the AMC zone in the neighboring sector overlaps the PUSC zone in the serving sector. As noted previously, the subcarriers allocated to the pilots in the AMC zone are different than the subcarriers allocated to the pilots in the PUSC zone. These overlapping pilot subcarriers contribute interference to the data transmitted on corresponding data subcarriers in the serving sector.

According to one exemplary embodiment of the present invention, a mobile station 102 served by a serving sector uses knowledge of the pilot symbols transmitted on overlapping pilot subcarriers in a neighboring sector when the subcarrier allocation zone in the neighboring sector differs from that in the serving sector. The received signal for the $n^{th}$ subcarrier in the $m^{th}$ symbol period may be expressed as:

$$r_m(n) = c_n^d(m) \cdot s_n^d(m) + c_n^i(m) \cdot s_n^i(m) + z_n(m), \quad (1)$$

where $s_n^d$ and $s_n^i$ are the desired and interfering symbols respectively, $c_n^d$ and $c_n^i$ are the corresponding channel estimates, and $z_n$ is white noise. When the division between subcarrier allocation zones in a neighboring sector is different, it is possible for one or more subcarriers allocated to a data subchannel in the serving sector to be used as a pilot subcarrier in the neighboring sector. By using knowledge of the pilot symbols transmitted in the neighboring sector, the mobile station 102 may at least partially cancel the interference to the desired symbol that is contributed by the pilot symbols transmitted on the overlapping pilot subcarriers.

In a WiMAX system, the preamble transmitted at the beginning of a frame indicates the sector ID of the transmitting sector. The mobile station 102 may synchronize to the preamble of a neighboring sector from which it can determine the sector ID for the neighboring sector. The sector ID may be used to determine the pilot symbols transmitted in the neighboring sector. The mobile station 102 may also read control information transmitted in the FCH and DL-MAP by the base station 106 in the neighboring sector indicating the division of subcarrier allocation zones. With this information, the mobile station 102 may determine periods during which pilot subcarriers in the neighboring sector will overlap in time and frequency with data subcarriers in the serving sector. The mobile station 102 can further determine the pilot indices for the overlapping pilot subcarriers based on the division of the subcarrier zones in the neighboring sector, since the pilot indices are fixed by the standard for PUSC and AMC zones.

To perform interference cancellation or suppression, the mobile station 102 obtains channel estimates for both the data channel and the interfering pilot channel. The channel estimate for the data channel, denoted $c_n^d$, may be obtained using the received symbols in the pilot subcarriers for the serving sector. Over a succession of symbols, the channel associated with the data carriers will be highly correlated. Thus, the channel estimates may be averaged over a number of symbol periods. A simple channel estimate for a data subcarrier transmitted by a serving sector is given by:

$$\hat{c}_n^d = \frac{1}{M} \sum_{m=1}^{M} r_n(m)(s_n^d(m))^*. \quad (2)$$

As shown by Eq. (2), the channel estimate for the data subcarrier is obtained by averaging over M pilot symbols that are within the coherence time and coherence bandwidth of the data subcarrier. Similarly, a channel estimate, denoted $c_n^i$, for an interfering pilot subcarrier in the neighboring sector is highly correlated over a succession of symbols. Thus, the channel estimate $c_n^i$, for the interfering pilot subcarrier may be obtained from:

$$\hat{c}_{n'}^i = \frac{1}{M} \sum_{m=1}^{M} r_{n'}(m) \cdot (s_{n'}^i(m))^*. \quad (3)$$

In some embodiments, the known preambles transmitted in the serving sector and the neighboring sector may be used to generate the channel estimates for the data subcarriers and interfering pilot subcarriers. In WiMAX systems, the preamble is one symbol period long. Channel estimates generated from the preamble may be used as initial channel estimates when other estimates are not available. The initial channel estimates may be refined using pilot subcarriers that are closer in the time/frequency plane to the data subcarrier of interest. This refinement using nearby pilot symbols provides a more reliable estimate due to variation of the channel in time and in frequency. A tracking algorithm may be used to track variations of the channel estimates over the course of a frame.

Other forms of channel estimation may be used as an alternative to the approach described above. For example, a maximum likelihood (ML) estimator or a maximum a posteriori probability (MAP) estimator may be used to generate the channel estimates. In general, the ML channel estimator does not need impairment statistics and is less complex to implement than the MAP estimator.

Once channel estimates for the data subcarriers of interest and the interfering pilot subcarriers are obtained using any of the above methods, a soft estimate ŝ(n) of the received symbol may be computed according to:

$$\hat{s}_n^d(m) = (r_n(m) - \hat{c}_n^i(m) \cdot s_n^i(m)) \cdot \frac{(\hat{c}_n^d(m))^*}{|(\hat{c}_n^d(m))^*|^2} = r_n'(m) \cdot \frac{(\hat{c}_n^d(m))^*}{|(\hat{c}_n^d(m))^*|^2}. \quad (4)$$

The soft symbol estimate $\hat{s}_n^d(m)$ may be passed to the demodulating/decoding circuit 24 by replacing the received symbol $r_n(m)$ with the symbol estimate $\hat{s}_n^d(m)$ for those data subcarriers where the interfering symbol from a neighboring sector is a known pilot symbol.

The invention has been described to this point in terms of a single dominant interferer, but may be extended to multiple interfering sectors. In this case, the mobile station 102 can compute channel estimates according to Eq. Error! Reference source not found, for each interfering pilot symbol in each sector and separately subtract the interference contributed by each pilot symbol. In more advanced receivers, the receiver 10 may perform a joint estimation of the channel associated with the interfering pilot symbols. For example, the receiver 10 may use successive subtraction of the interfering pilot symbols beginning with the strongest pilot symbol.

Figure 4:
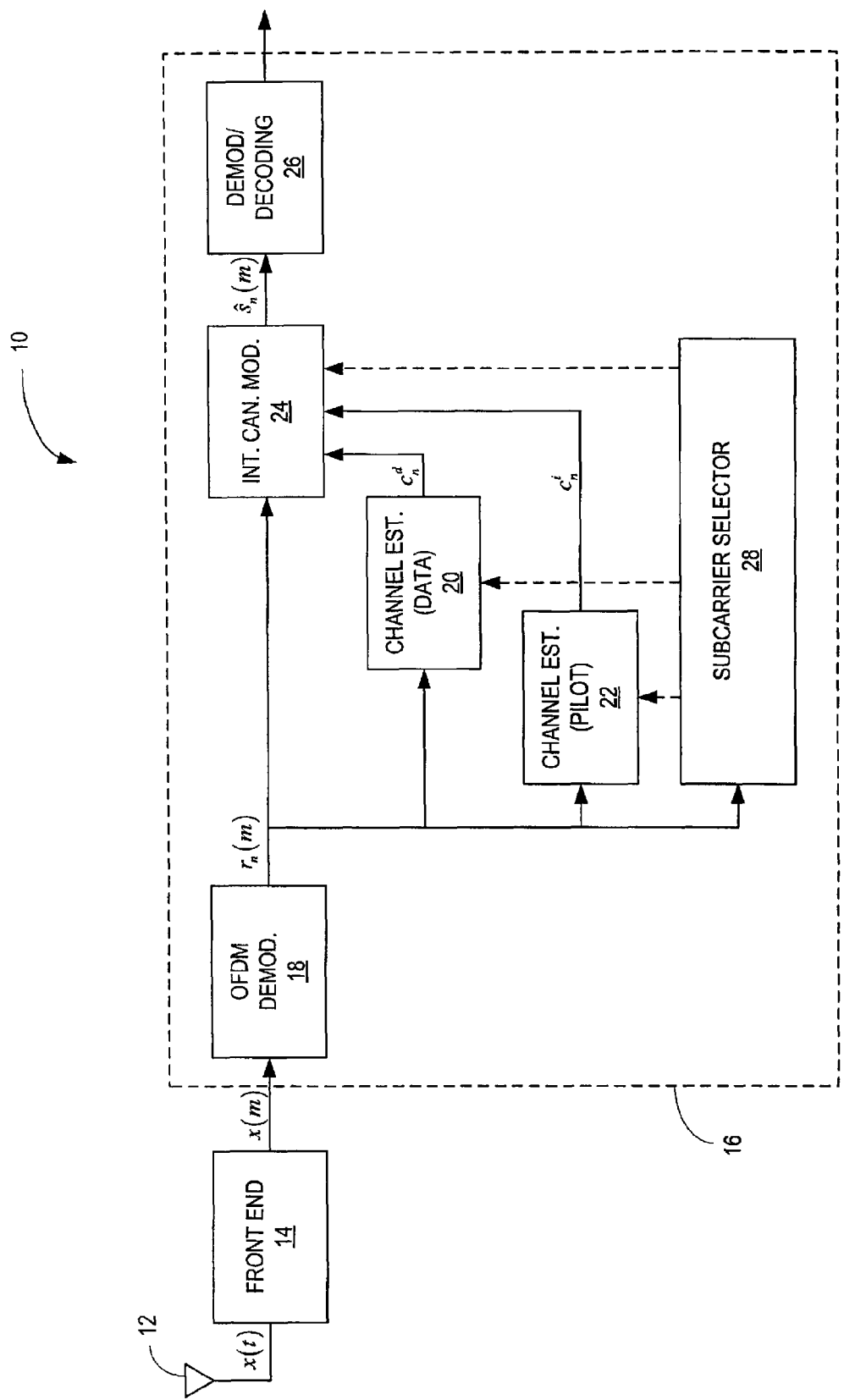
FIG. 4 illustrates an exemplary multicarrier receiver according to one embodiment of the present invention.

FIG. 4 is a block diagram of a multicarrier receiver 10 according to one exemplary embodiment of the present invention for a WiMAX system. The receiver 10 comprises one or more receive antennas 12 for receiving transmitted signals, a front end circuit 14 coupled to the antennas 12, and a baseband processing circuit 16. The front end circuit 14 comprises conventional RF circuitry for downconverting, filtering, and amplifying signals received by the antennas 12. The received analog signal x(t) is then sampled and converted to a digital baseband signal x(m) for input to the baseband processing circuit 16. The digital baseband signal x(m) comprises a sequence of OFDM symbols transmitted over a subchannel of interest having N data subcarriers and represented by x(m)= [$x_0(m), x_1(m), \ldots, x_N(m)$]. The baseband processing circuit 16 processes each OFDM symbol x(m) in the received signal to generate an estimate of each transmitted symbol $\hat{s}_n(m)$.

The baseband processing circuit 16 includes an OFDM demodulator 18, channel estimators 20 and 22, interference cancellation module 24, demodulation/decoding circuits 26, and subcarrier selector 28. The OFDM demodulator 18 removes the OFDM modulation from the received signal by applying a Fast Fourier Transform (FFT) to the received OFDM signal. The output of the OFDM demodulator 18 is referred to herein as the received signal $r_n(m)$. The received signal $r_n(m)$ is input to channel estimators 20, 22, interference cancellation module 24, and subcarrier selector 28. The channel estimator 20 generates channel estimates $c_n^d$ corresponding to the data subcarriers for the subchannel of interest. Channel estimator 22 generates channel estimates $c_n^i$ for the overlapping pilot subcarriers in a neighboring sector. The interference cancellation module 24 uses the channel estimates $c_n^d$ and $c_n^i$ provided respectively by the channel estimators 20 and 22, and knowledge of the interfering pilot symbols transmitted on the interfering pilot subcarriers to cancel interference from the received signal and to generate an estimate $\hat{s}_n(m)$ of each symbol of interest. The subcarrier selector 28 provides subcarrier indices to the channel estimators 20, 22 to indicate the subcarriers for which channel estimates are needed. The subcarrier selector 28 further provides subcarrier indices to the interference cancellation module 24 to indicate the data subcarriers on which interference cancellation should be performed. The symbol estimate $\hat{s}_n(m)$ is input to demodulating/decoding circuits 26 for demodulation and decoding.

Figure 5:
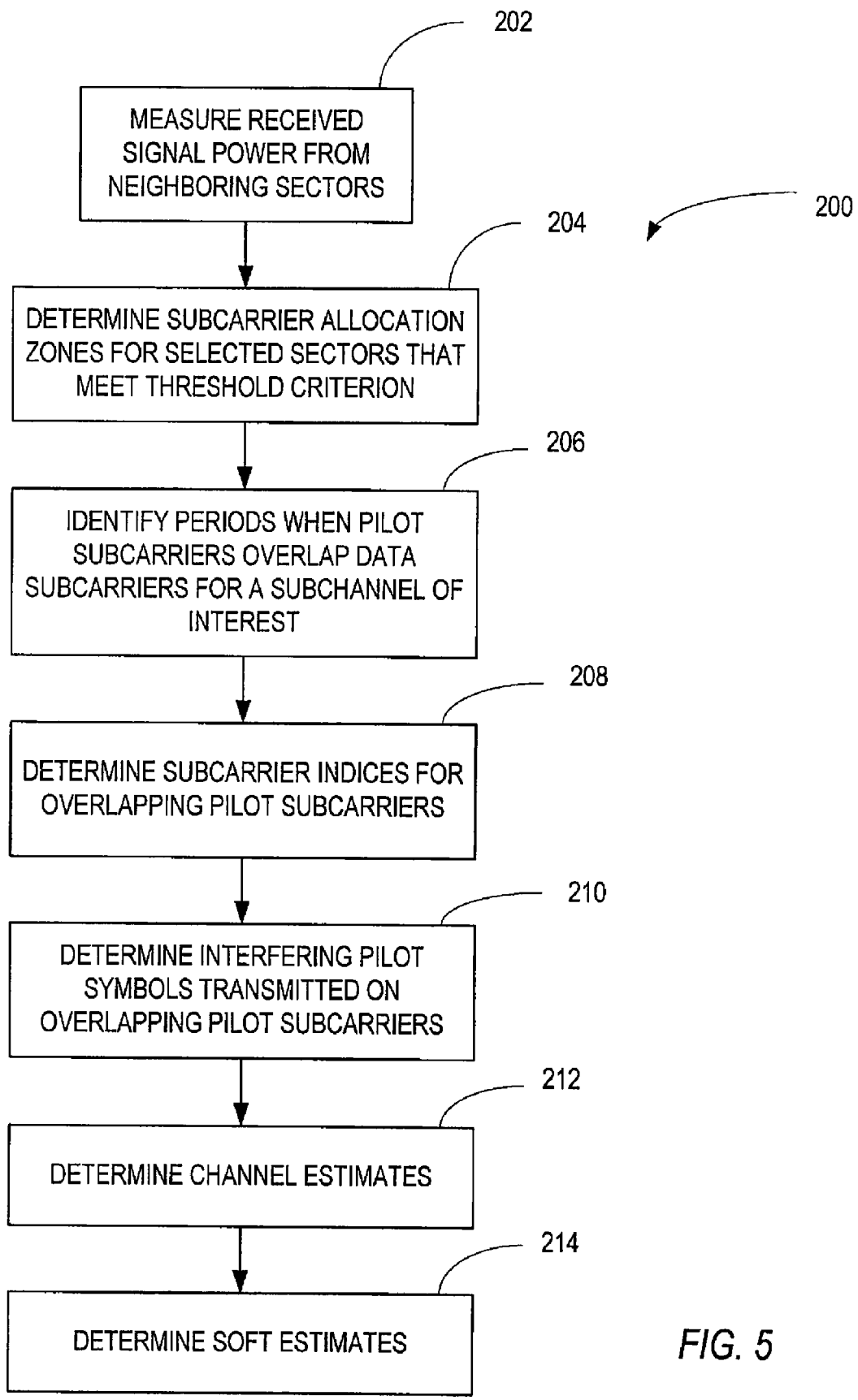
FIG. 5 illustrates an exemplary method implemented by the multicarrier receiver for reducing interference

FIG. 5 is a flow diagram illustrating an exemplary method 200 implemented by the receiver 10 for reducing interference. The receiver 10 estimates the power of the signal received from neighboring sectors using the preamble transmitted from the neighboring sectors (block 202). The power estimates are used to determine which sectors are contributing significant levels of interference. A threshold power value may be used to make this determination. The receiver 10 then demodulates and decodes control messages from the neighboring sector which meet the threshold, and determines the subcarrier allocation zones used in the neighboring sector (block 204). With this information, the receiver 10 identifies periods when pilot subcarriers in the neighboring sectors overlap with data subcarriers on a subchannel of interest in the serving sector (block 206). If it is determined that overlapping pilot subcarriers are present in the neighboring sector, the receiver 10 determines the pilot indices for the pilot subcarriers that overlap in time and frequency with data subcarriers of interest transmitted by the serving sector (block 208). The receiver 10 also determines the pilot symbols being transmitted by the neighboring sectors using the sector ID for the neighboring sector as previously described (block 210). Channel estimates are generated for the overlapping pilot subcarriers (block 212). The channel estimator 20 given by Eq. Error! Reference source not found, may be used or, alternatively, an ML channel estimator may be used to generate the channel estimates. Soft symbol estimates $\hat{s}_n(m)$ are then generated for the data subcarriers in the subchannel of interest (block 214). For the data subcarriers where there is an overlapping pilot subcarrier, the received symbol $r_n(m)$ is replaced by the estimated symbol $\hat{s}_n(m)$. Otherwise the received symbol $r_n(m)$ is provided to the demodulating/decoding circuit 26.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reducing interference in a received data symbol, said method comprising:
   receiving a data symbol transmitted on one or more data subcarriers in a first sector;
   determining overlapping pilot subcarriers in a second sector;
   determining one or more overlapping pilot symbols transmitted on the overlapping pilot subcarriers;
   generating channel estimates associated with said overlapping pilot subcarriers in said second sector; and
   reducing interference in said received data symbol based on said one or more overlapping pilot symbols and said channel estimates.

2. The method of claim 1 wherein determining overlapping pilot subcarriers in the second sector comprises determining pilot subcarrier allocation for the second sector to identify pilot subcarriers overlapping in frequency and time with one or more data subcarriers in the first sector.

3. The method of claim 2 wherein determining pilot subcarrier allocation for the second sector comprises determining the location of subcarrier allocation zones in a frame, and determining the pilot subcarriers in said subcarrier allocation zones.

4. The method of claim 1 wherein determining one or more overlapping pilot symbols transmitted on the overlapping pilot subcarriers comprises detecting a preamble transmitted in the second sector to obtain a sector identifier, and determining the one or more overlapping pilot symbols based on the sector identifier.

5. The method of claim 1 wherein generating channel estimates associated with said overlapping pilot subcarriers in said second sector comprises averaging said channel estimates over a plurality of symbol periods.

6. The method of claim 1 wherein generating channel estimates associated with said overlapping pilot subcarriers in said second sector comprises computing the channel estimates with a maximum likelihood estimator.

7. The method of claim 1 wherein generating channel estimates associated with said overlapping pilot subcarriers in said second sector comprises computing the channel estimates with a maximum a posteriori probability estimator.

8. A mobile terminal comprising:
 a receiver to receive a data symbol transmitted on one or more data subcarriers in a first sector;
 a subcarrier selector configured to:
  determine overlapping pilot subcarriers in a second sector; and
  determine one or more overlapping pilot symbols transmitted on the overlapping pilot subcarriers;
 a channel estimator to generate channel estimates associated with said overlapping pilot subcarriers in said second sector; and
 an interference cancellation module to reduce interference in said received data symbol based on said one or more overlapping pilot symbols and said channel estimates.

9. The mobile terminal of claim 8 wherein the subcarrier selector determines overlapping pilot subcarriers in the second sector by determining pilot carrier allocation for the second sector to identify pilot subcarriers overlapping in frequency and time with one or more data subcarriers in the first sector.

10. The mobile terminal of claim 9 wherein the subcarrier selector determines pilot carrier allocation for the second sector by determining the location of subcarrier allocation zones in a frame, and determining the pilot subcarriers in said subcarrier allocation zones.

11. The mobile terminal of claim 8 wherein the subcarrier selector determines one or more overlapping pilot symbols transmitted on the overlapping pilot subcarriers by detecting a preamble transmitted in the second sector to obtain a sector identifier, and determining the one or more overlapping pilot symbols based on the sector identifier.

12. The mobile terminal of claim 8 wherein said channel estimator averages said channel estimates over a plurality of symbol periods.

13. The mobile terminal of claim 8 wherein the channel estimator comprises a maximum likelihood estimator.

14. The mobile terminal of claim 8 wherein the channel estimator comprises a maximum a posteriori probability estimator.

* * * * *